UNITED STATES PATENT OFFICE.

JOHN M. WEISS, OF NEW YORK, N. Y., AND CHARLES R. DOWNS, OF CLIFFSIDE, NEW JERSEY, ASSIGNORS TO THE BARRETT COMPANY, A CORPORATION OF NEW JERSEY.

PRODUCTION OF BENZALDEHYDE.

1,321,959.      Specification of Letters Patent.      Patented Nov. 18, 1919.

No Drawing.      Application filed June 25, 1919. Serial No. 306,566.

*To all whom it may concern:*

Be it known that we, JOHN M. WEISS and CHARLES R. DOWNS, citizens of the United States, residing at (1) 210 West 110th street, New York, and (2) Cliffside, in the counties of (1) New York and (2) Bergen and States of (1) New York and (2) New Jersey, have invented certain new and useful Improvements in the Production of Benzaldehyde, of which the following is a specification.

This invention relates to a process for producing benzaldehyde from toluene. It relates more particularly to the production of benzaldehyde by the oxidation of toluene in the vapor phase in the presence of an oxid of molybdenum as a catalyst.

In carrying out this invention commercial toluol (toluene $C_7H_8$) is vaporized in any convenient way and is mixed in suitable proportions with an oxygen containing gas. For this purpose air may be used, or pure oxygen or ozone or a mixture of any or all of these or other gases which contain free oxygen, together with a certain amount of blanketing or diluent gases or steam in order to aid in the control of the rapidity and completeness of the reaction, may be beneficially employed. It is desirable that the toluol vapors be mixed with a sufficient amount of the oxygen containing gas to produce the chemical reaction indicated in the equation.

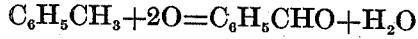
$$C_6H_5CH_3 + 2O = C_6H_5CHO + H_2O$$

The catalyst may be an oxid of molybdenum such as $MoO_3$, and may be distributed upon any convenient carrier such as pumice, asbestos, etc. It is preferable to introduce the catalyst or the carrier containing the same into tubes or containers through which the mixture of toluol vapors and oxygen containing gas is passed. The tubes or containers containing the catalyst are heated in any convenient manner until the temperature reaches 500° C., or above, when the desired reaction takes place without the formation of an inordinate amount of byproducts such as $H_2O$ and $CO_2$, thus indicating that very little, if any, complete combustion accompanies the reaction.

While the best results have thus far been obtained by using a mixture of air and toluol vapors in approximately equal proportions, with an oxid of molybdenum as the catalyst, at a temperature slightly above 500° C. at approximately atmospheric pressure, considerably higher temperatures, say up to 700° C., or above, may be used at pressures above and below atmospheric and with different proportions of oxygen containing gases. It has been found that a very small yield of benzaldehyde is obtained at temperatures below 500° C. when using a mixture of air and toluol vapors under the above mentioned conditions. Other catalyzers will produce benzaldehyde mixed with other products, but molybdenum oxid produces only benzaldehyde as a reaction product with water as a by-product.

After the products of reaction have passed out of the reaction zone the condensable portions of the same may be condensed and separated in the usual manner for the recovery of benzaldehyde which may be stored for future use, while the uncondensed gases may be permitted to escape. Any unchanged toluol may be again passed through the reaction zone, such toluene having been enriched with oxygen containing gas, when necessary, before recirculating it through the reaction zone.

Claims:

1. The herein described process which comprises passing a mixture of toluol vapors and an oxygen containing gas through a hot reaction zone which contains an oxid of molybdenum, maintained at a temperature above 500° C., whereby benzaldehyde is produced.

2. The herein described process which comprises passing a mixture of toluol vapors and air through a hot reaction zone which contains an oxid of molybdenum, maintained at a temperature above 500° C. whereby benzaldehyde is produced.

3. The herein described process which comprises passing a mixture of toluol vapors and an oxygen containing gas through a hot reaction zone which contains an oxid of molybdenum, maintained at a temperature between 500° C. and 700° C., whereby benzaldehyde is produced.

In testimony whereof we affix our signatures.

JOHN M. WEISS.
CHARLES R. DOWNS.